(12) United States Patent
Rowley

(10) Patent No.: US 7,895,176 B2
(45) Date of Patent: Feb. 22, 2011

(54) ENTRY GROUP TAGS

(75) Inventor: Peter Andrew Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 11/606,839

(22) Filed: Nov. 29, 2006

(65) Prior Publication Data

US 2008/0126355 A1 May 29, 2008

(51) Int. Cl.
*G06F 17/30* (2006.01)
(52) U.S. Cl. .................................. 707/706; 707/758
(58) Field of Classification Search ............... 707/706, 707/758
See application file for complete search history.

(56) References Cited

U.S. PATENT DOCUMENTS

| | | | | |
|---|---|---|---|---|
| 5,819,275 | A * | 10/1998 | Badger et al. | 707/758 |
| 5,918,233 | A * | 6/1999 | La Chance et al. | 707/706 |
| 6,035,297 | A * | 3/2000 | Van Huben et al. | 707/695 |
| 6,092,074 | A * | 7/2000 | Rodkin et al. | 715/205 |
| 6,366,913 | B1 * | 4/2002 | Fitler et al. | 709/203 |
| 6,463,440 | B1 * | 10/2002 | Hind et al. | 715/235 |
| 6,516,312 | B1 * | 2/2003 | Kraft et al. | 707/610 |
| 6,718,333 | B1 * | 4/2004 | Matsuda | 715/234 |
| 6,768,988 | B2 | 7/2004 | Boreham et al. | |
| 6,785,686 | B2 | 8/2004 | Boreham et al. | |
| 6,785,688 | B2 * | 8/2004 | Abajian et al. | 707/700 |
| 6,915,303 | B2 * | 7/2005 | Kauffman | 707/706 |
| 7,016,893 | B2 | 3/2006 | Boreham et al. | |
| 7,016,907 | B2 | 3/2006 | Boreham et al. | |
| 7,020,662 | B2 | 3/2006 | Boreham et al. | |
| 7,051,031 | B2 * | 5/2006 | Schein | 707/697 |
| 7,130,839 | B2 | 10/2006 | Boreham et al. | |
| 2005/0021498 | A1 * | 1/2005 | Boreham et al. | 707/1 |
| 2005/0065811 | A1 * | 3/2005 | Chu et al. | 705/1 |
| 2005/0259164 | A1 * | 11/2005 | Kudo | 348/231.2 |

* cited by examiner

*Primary Examiner*—Don Wong
*Assistant Examiner*—Kim T Nguyen
(74) *Attorney, Agent, or Firm*—Blakely, Sokoloff, Taylor & Zafman LLP

(57) ABSTRACT

A method and apparatus for managing a directory server is described. In one embodiment, a value of an attribute of an entry in the directory server is received. The value of the attribute identifies a group. The entry is added to a group based on the value of the attribute. A content of the group is dynamically changed based on the value of the attribute of the entry.

18 Claims, 9 Drawing Sheets

600 

LDIF fragment to create group branch under root 602 dn: ou=groups,dc=example,dc=com
objectclass:organizationalunit
ou: groups
description: groups branch create the hrpeople entry dn: cn=hrpeople,dc=groups,dc=example,dc=com
objectclass: groupofnames
cn: hrpeople
description: HR group
604 # add the group members all of which are
assumed to exist under people
member: cn=john doe,ou=people,dc=example,dc=com
member: cn=jane doe,ou=people,dc=example,dc=com
...

MANUAL ENTRY
OF EACH MEMBER

FIG.6

ENTRY GROUP TAGS

TECHNICAL FIELD

Embodiments of the present invention relate to a Lightweight Directory Access Protocol (LDAP), and more specifically to entry group tags.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

Entries may be part of a group, for example, a static group. The static group is one which where membership is specified by presence in a list. Thus, a static group may comprises a list of members. The specific members are listed and identified by their attribute. Membership may change at any time, just as one might cross a name off the paper list or write in a new name. Such a potentially large static group may be either prone to error or not always up to date.

BRIEF DESCRIPTION OF THE DRAWINGS

The present invention is illustrated by way of example, and not by way of limitation, in the figures of the accompanying drawings and in which:

FIG. 6 illustrates an example of an entry of the group of FIG. 5.

DETAILED DESCRIPTION

Figure 1:
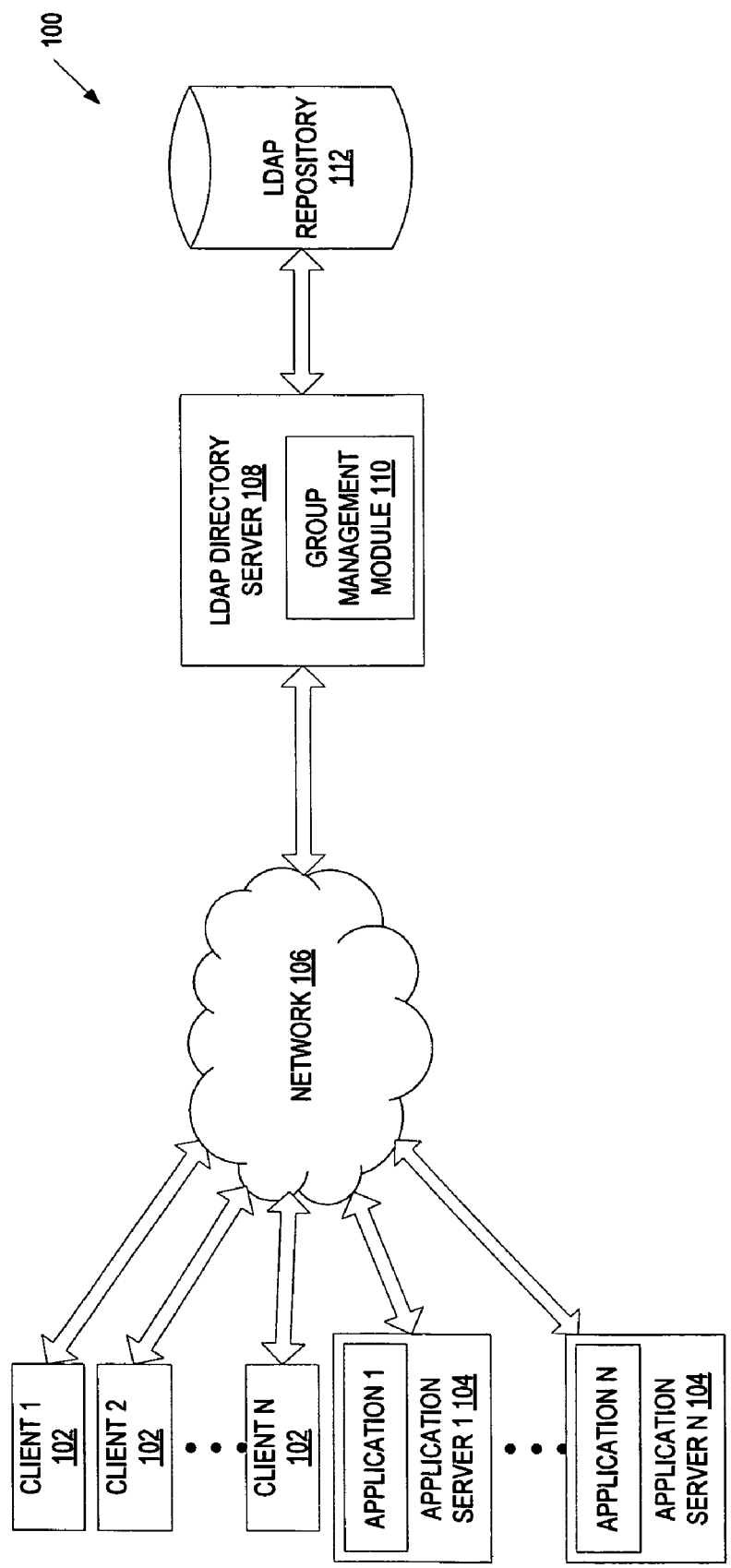
FIG. 1 illustrates a network architecture in which embodiments of the present invention may be implemented.

Described herein is a method and apparatus for managing entry group tags in a directory server is described. In one embodiment, a value of an attribute of an entry in the directory server is received. The value of the attribute identifies a group. The entry is added to a group based on the value of the attribute. A content of the group is dynamically changed based on the value of the attribute of the entry.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). Server 108 may be a single server or a cluster of servers. The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP directory server 108 includes a group management module 110 that may be part of the LDAP directory server 108 or some other device and/or program, or be an independent module implemented in hardware, software or a combination thereof.

In one embodiment, the group management module 110 manages groups formed in the LDAP directory server 108 based on values of tag attribute of entries in the LDAP directory server 108. Groups are typically defined based on certain common characteristics or description of members of the groups. A member can be included in a group if the member has a value of a tag attribute corresponding to the group. Groups can be static or dynamic.

A static group is one where membership is specified by presence in a list. For example, a static group may comprise a list of members. The specific members are listed and identified by their attribute. Membership may change at any time, just as one might cross a name off the paper list or write in a new name. The operation and management of a static group is further described in FIG. 4.

A dynamic group is one where membership is inherent in some property of the entries. For example, a group containing a number of persons in an organization may be "everyone who works in the HR department". This would be defined by a filter (query) against the directory for "department=HR". As people are hired, laid-off, or transferred in the company, they may become part of the HR department group. One key feature of dynamic groups is that they require less explicit maintenance. On the other hand, a static group that is intended to contain everyone in the HR department would need to be maintained, either manually or by a script. Such a potentially large static group may be either prone to error or not always up to date. There are also implementation efficiency issues relating to static versus dynamic groups. Thus, in a dynamic group, instead of looking at a group attribute to verify if a user possesses the group attribute, membership is determined by checking a user attribute, which can be specified arbitrarily.

In accordance with one embodiment, the group management module 110 receives a value of an attribute of an entry in the LDAP directory server 108. The value of the attribute identifies a group. The group management module 110 adds the entry to the identified group based on the value of the attribute. The group management module 110 then dynamically changes a content of the identified group based based on the value of the attribute of the entry in the LDAP directory server 108.

Figure 2:
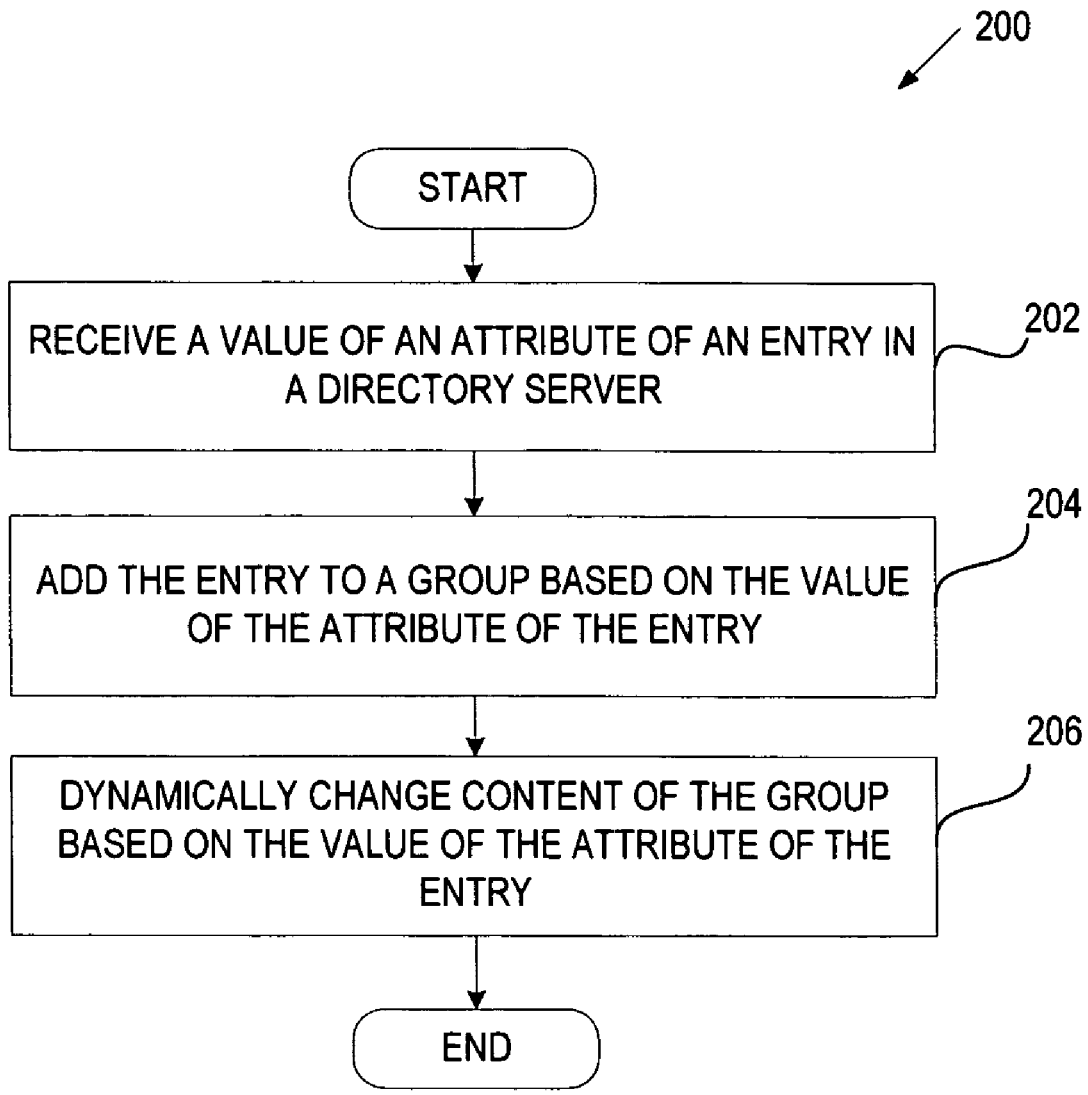
FIG. 2 illustrates a flow diagram of one embodiment of a method for managing groups in a directory server.

FIG. 2 illustrates a flow diagram of one embodiment of a method 200 for managing groups in a LDAP directory server. The method may be performed by processing logic that may comprise hardware (e.g., circuitry, dedicated logic, programmable logic, microcode, etc.), software (such as instructions run on a processing device), or a combination thereof. In one embodiment, method 200 is performed by the group management module 110 of the LDAP directory server 108 of FIG. 1.

Referring to FIG. 2, at block 202, a processing logic of the LDAP directory server 108 receives a value of an attribute of an entry in the LDAP repository 112. For example, the value of the attribute may descriptively or arbitrarily identify a group such as the HR group, or the IT group. The attribute may comprise a tag attribute. In accordance with one embodiment, the group may comprise a static group. In accordance with another embodiment, the group may comprise a dynamic group. The entry may include a distinguished name (DN).

At block 204, processing logic adds the entry to the group based on the value of the attribute of the entry. For example, if the value of a tag attribute of an entry is "IT", the entry may be added to a group named "IT".

At block 206, processing logic dynamically changes the content of the group based on the value of the attribute of the entry in the LDAP directory server 108. In accordance with one embodiment, the content of the group may comprise a membership. The content of the group may be dynamically changed by first determining that the value of the attribute of the entry corresponds to the group and second adding the entry to the content of the group. For example, an entry for an employee of a company may include the following tag attribute: "tag=HRpeople". The processing logic determines whether the value of the tag attribute ("HRpeople") corresponds to a group. Assuming the group called "HRpeople" already exists in the LDAP directory server 108, the entry for the employee with the above tag attribute is thus added as a member of the "HRpeople" group in the LDAP directory server. Thus the content of the "HRpeople" group may be dynamically changed and updated based on the value of the tag attribute of the entries for the employees of the company. Furthermore, the content of the group may be dynamically changed such that the entry does not have to be manually added to the group.

Figure 3:
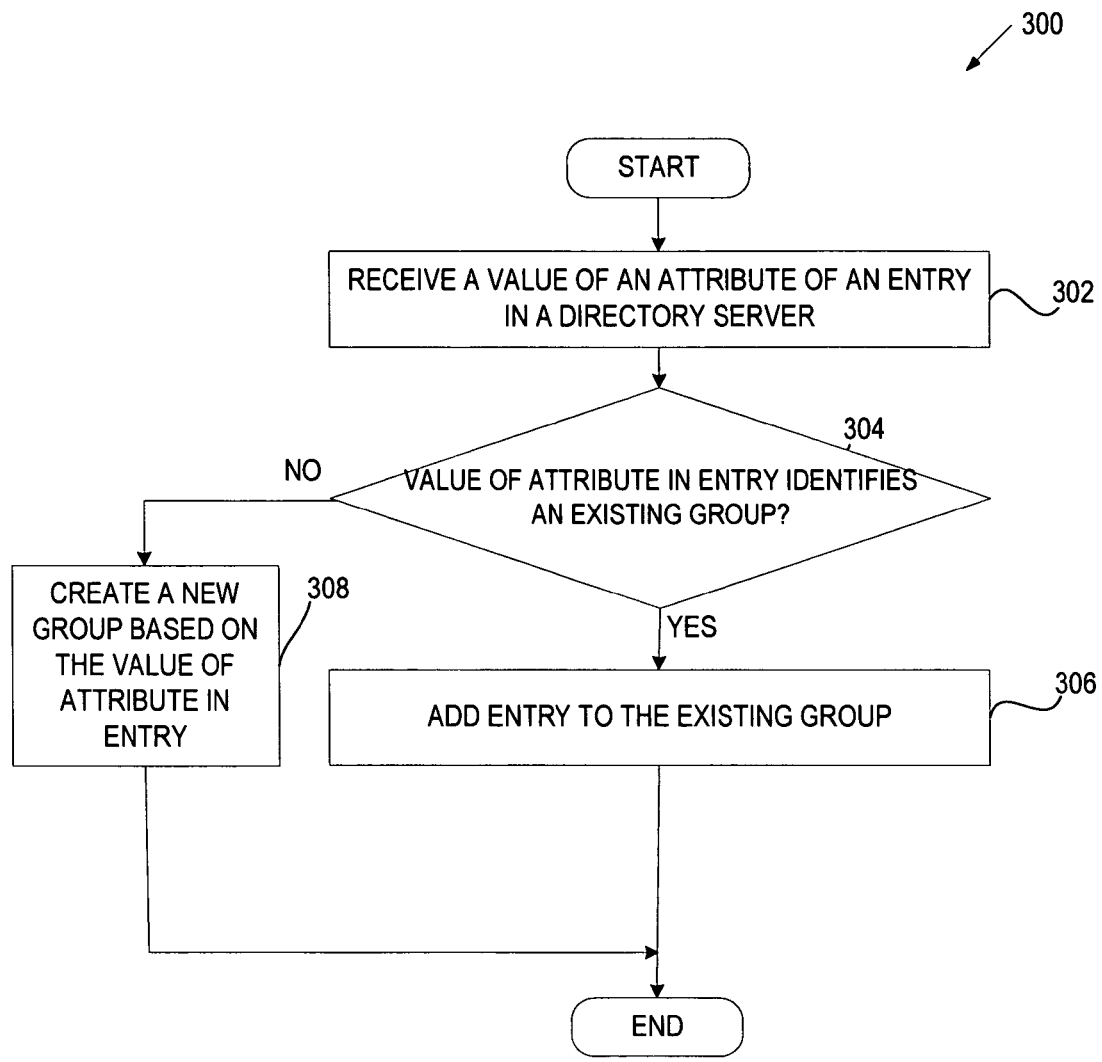
FIG. 3 illustrates a flow diagram of another embodiment of a method for managing groups in a directory server.

FIG. 3 illustrates a flow diagram of an alternative embodiment of a method for managing groups in an LDAP directory server. The method may be performed by processing logic that may comprise hardware (e.g., circuitry, dedicated logic, programmable logic, microcode, etc.), software (such as instructions run on a processing device), or a combination thereof. In one embodiment, the method is performed by the LDAP directory server 108 of FIG. 1.

Referring to FIG. 3, at block 302, a processing logic of the LDAP directory server 108 receives a value of a tag attribute of an entry in the LDAP repository 112. For example, the value may arbitrarily describe the entry (e.g. HR person, or the IT person). The value of the tag attribute may be associated with an existing group or a new group. In accordance with one embodiment, the group may comprise a static group. In accordance with another embodiment, the group may comprise a dynamic group. The entry, for example, may have a unique identifier such as its Distinguished Name (DN).

At block 304, processing logic determines whether the value of the tag attribute of the entry identifies an existing group in the LDAP repository 112. Following the above example described with respect to FIG. 2, processing logic determines whether the value of the tag attribute corresponds to an existing group in the LDAP directory repository 112.

At block 306, if the value of the tag attribute of the entry identifies an existing group in the LDAP repository 112, the entry is added to the content of the identified existing group. For example, an entry having a tag attribute of "tag=HR" may be added to the HR group in the LDAP repository 112.

At block 308, if the value of the tag attribute of the entry does not correspond or identify an existing group in the LDAP repository 112, a new group based on the value of the tag attribute is created in the LDAP repository 112. The entry is added to the content of a newly created group. For example, an entry having a tag attribute of "tag=legal" may be added to a newly created "Legalpeople" group in the LDAP repository 112. Thus, a new group can be created if it does not already exist in the LDAP repository 112 without having to be manually added. The new group may be based on the value of the tag attribute of the entry. The action performed in block 308 may thus include creating a new group in the LDAP repository 112 based on the value of the tag attribute.

Figure 4:
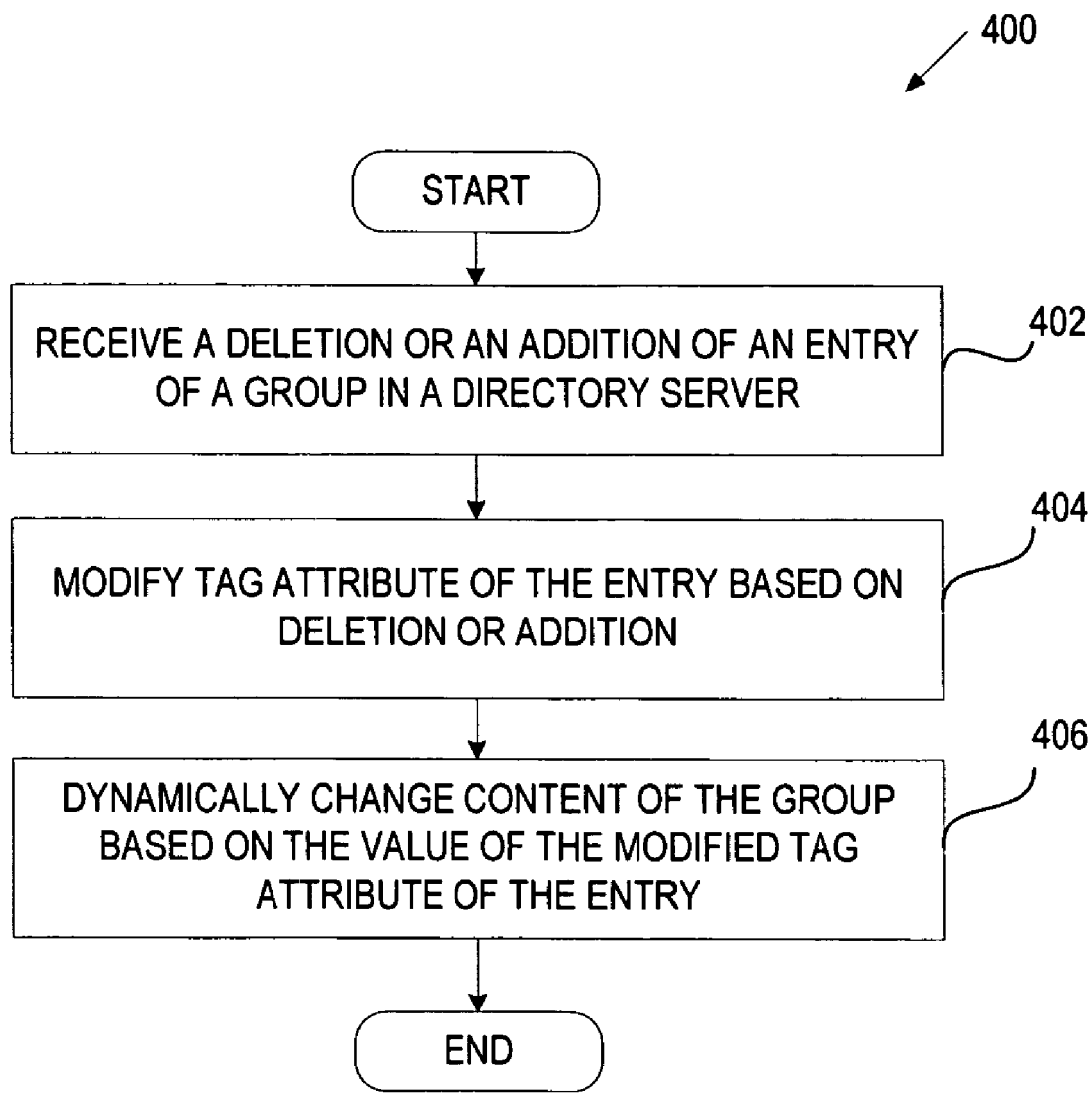
FIG. 4 illustrates a flow diagram of another embodiment of a method for managing groups in a directory server.

Any action of the groups in the LDAP directory server 108 is also reflected in the values of the tag attribute of the corresponding entries. Referring to FIG. 4, at block 402, a processing logic of the LDAP directory server 108 receives a deletion or an addition of an entry of a group in the LDAP repository 112. At 404, the tag attribute of the corresponding entry is modified based on the action received in the LDAP repository 112 (e.g. delete or add). For example, if an entry of "John" of HR is deleted from the HR group and added to the legal group, the tag attribute of the entry of "John" is accordingly modified from "tag=hr" to "tag=legal". Thus, as shown in block 406, the content of the groups in the LDAP repository 112 is dynamically changed based on the changed value of the tag attribute.

In accordance with another embodiment, if the value of a tag attribute of an entry no longer corresponds to a group in the LDAP repository 112, the entry may be deleted from the content of that group. In one embodiment, if the group has no other members, the entire group is deleted. For example, if a tag attribute of an entry previously has "tag=HRperson", and now has "tag=Legalperson", the employee would be removed from the HRperson group. If the HRperson group has no other members, the HRperson group is deleted. As described in FIGS. 2, 3, and 4, the content of the group may be dynamically changed such that the entry does not have to be manually added to the group.

Figure 5:
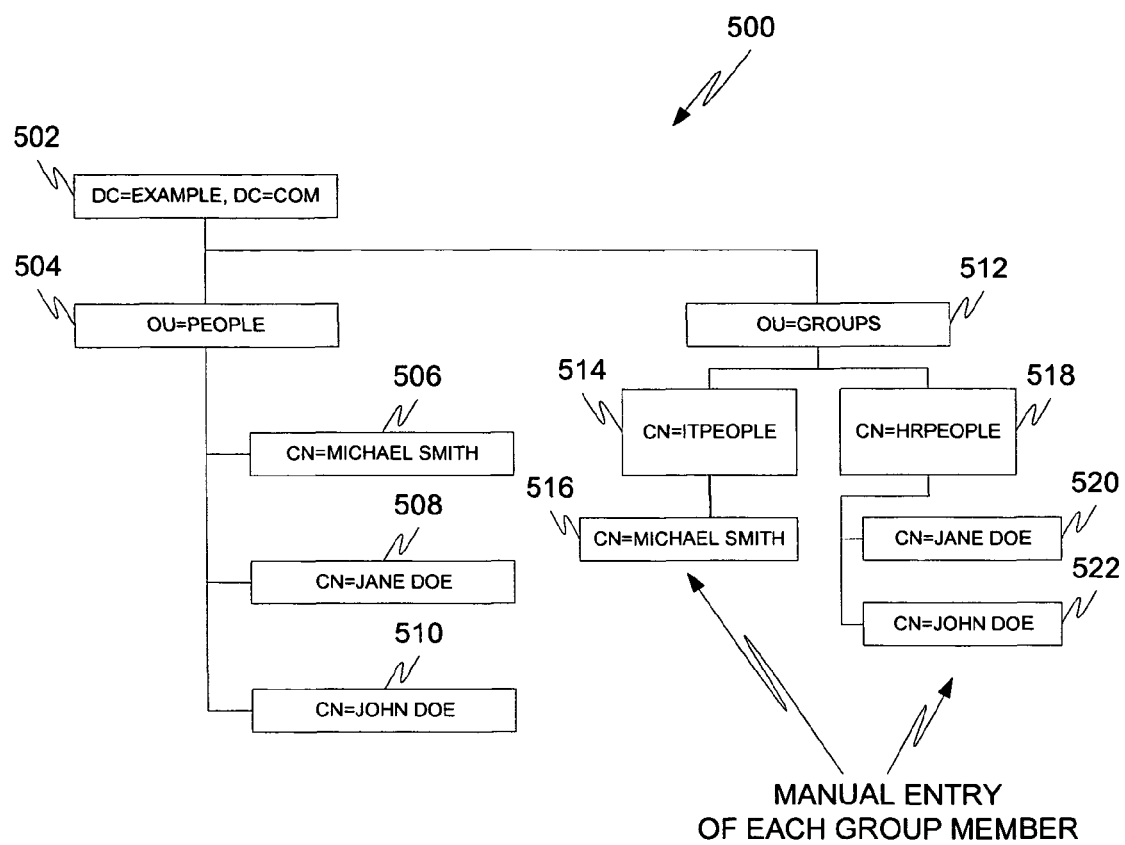
FIG. 5 illustrates a block diagram of a group of a conventional directory server.

FIG. 5 illustrates a block diagram of a conventional group management of an LDAP directory server. The distributed directory tree 500 includes a root entry 502 where a company named "Example.com" has a root entry of "dc=example, dc=com". The root entry 502 has a first node 504, and a second node 512. The first node 504 and second node 512 include entries for the organization unit (ou). For example, the first node 504 defines an organization unit subtree for employees in the company (ou=people). Entries 506, 508, 510 corresponds to the individual employees working in the company. Each entry includes a Relative Distinguished Name (RDN) such as cn=michael smith in entry 506. The second node 512 defines an organization unit subtree for groups in the company (ou=groups).

The groups may be composed of IT people 514 and HR people 518. The content of each group can be populated and maintained by manually entering the group members for the respective group. The content of each group includes members that are assumed to exist in the company (under "ou=people" branch 404). For example, the IT people 514 may comprise employee Michael Smith 516. The HR people 518 may comprise employees Jane Doe 520, and John Doe 522. The content of the group are manually entered and thus manually updated.

FIG. 6 illustrates an example of a conventional LDIF fragment 600 that shows building a group called "hrpeople" who could be given privileges to access confidential employee documents such as employment agreements, salary, etc. The individual group member entries 604 are manually entered and are assumed to already exist in the directory under "ou=people" branch. This configuration creates a separate branch called "groups" 602 under which is placed the "hrpeople" group. FIG. 6 is based on the graphical illustration of the organization "example.com" previously illustrated in FIG. 5.

Figure 7:
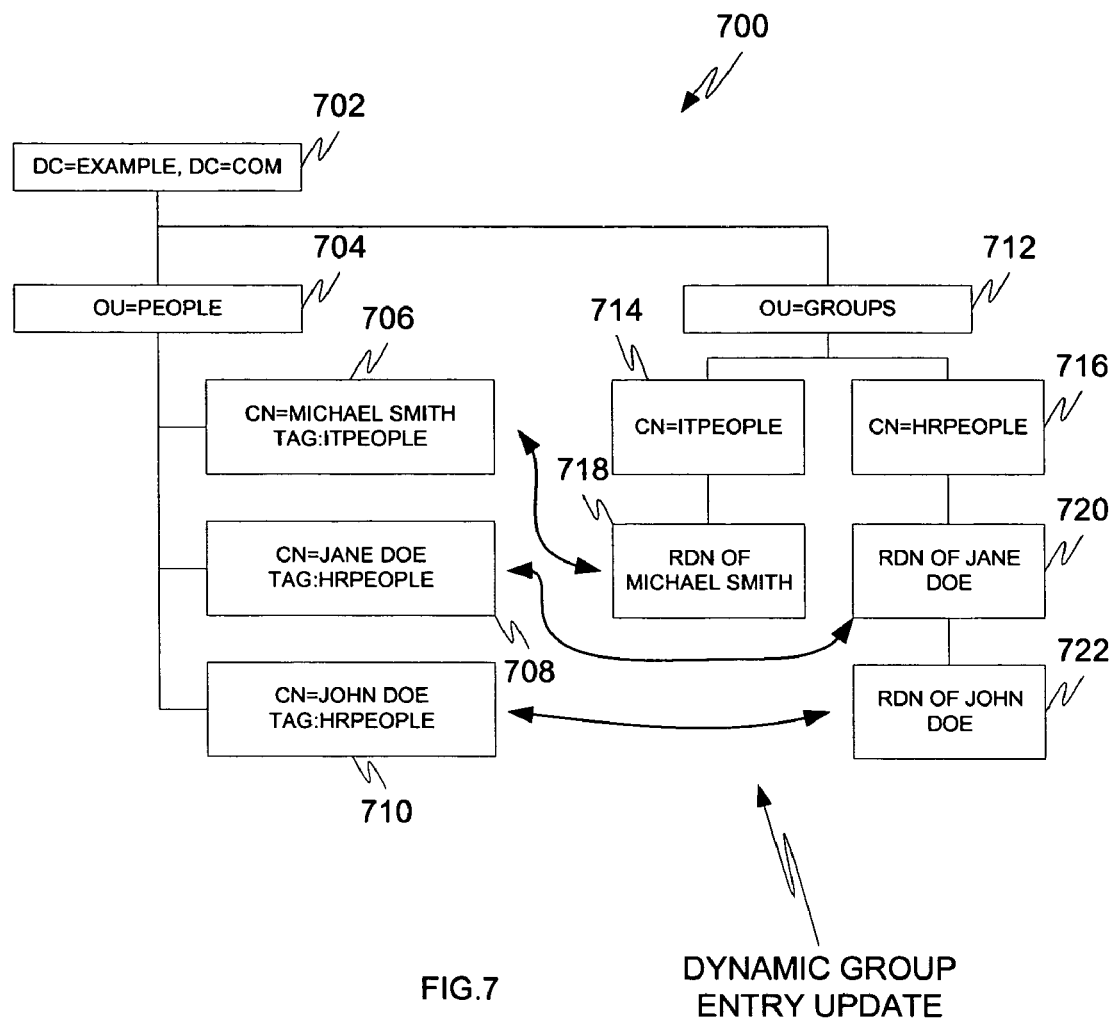
FIG. 7 illustrates a block diagram of a group of a directory server in accordance with one embodiment.

FIG. 7 illustrates a block diagram of one embodiment of a group management of an LDAP directory server. The distributed directory tree 700 includes a root entry 702 where a company named "Example.com" has a root entry of "dc=example, dc=com". The root entry 702 has a first node 704, and a second node 712. The first node 704 and second node 712 include entries for the organization unit (ou). For example, the first node 704 defines an organization unit subtree for employees in the company (ou=people). Entries 706, 708, 710 correspond to the individual employees working in the company "example.com". Each entry includes a Relative Distinguished Name (RDN) and at least another attribute. In accordance with one embodiment, a tag attribute may include values that describe or associate the entry as a member of a particular group. The tag attribute may for example be "tag". For example, entry 706 may include "tag:itpeople". This entry may be associated with an "itpeople" group of the organization "example.com".

Similarly, entry 708 may include "cn=jane doe" and "tag=hrpeople". This entry may be associated with an "hrpeople" group of the organization "example.com".

Similarly, entry 710 may include "cn=john doe" and "tag=hrpeople". This entry may be associated with the "hrpeople" group of the organization "example.com".

In accordance with another embodiment, each entry may include more than one tag attribute, for example, an entry of an employee working in both legal and hr may include a tag attribute for each: tag=hrperson, tag=legalperson.

The second node 712 defines an organization unit subtree for groups in the company (ou=groups). The groups may comprise IT people 714 and HR people 716. The content of each group is dynamically populated and maintained based on the value of the tag attribute in the employee entries 706, 708, 710. The content of each group includes members that are based on the value of the tag attribute in the employee entries 706, 708, 710. For example, a query for the content of the IT people 714 may return the entry of employee Michael Smith 718. A query for the content of the HR people 716 may return entries of employees Jane Doe 720, and John Doe 722. Thus, the content of the groups is dynamically changed and populated based on the value of the tag attribute in the entries under "ou=people" 704.

Figure 8:
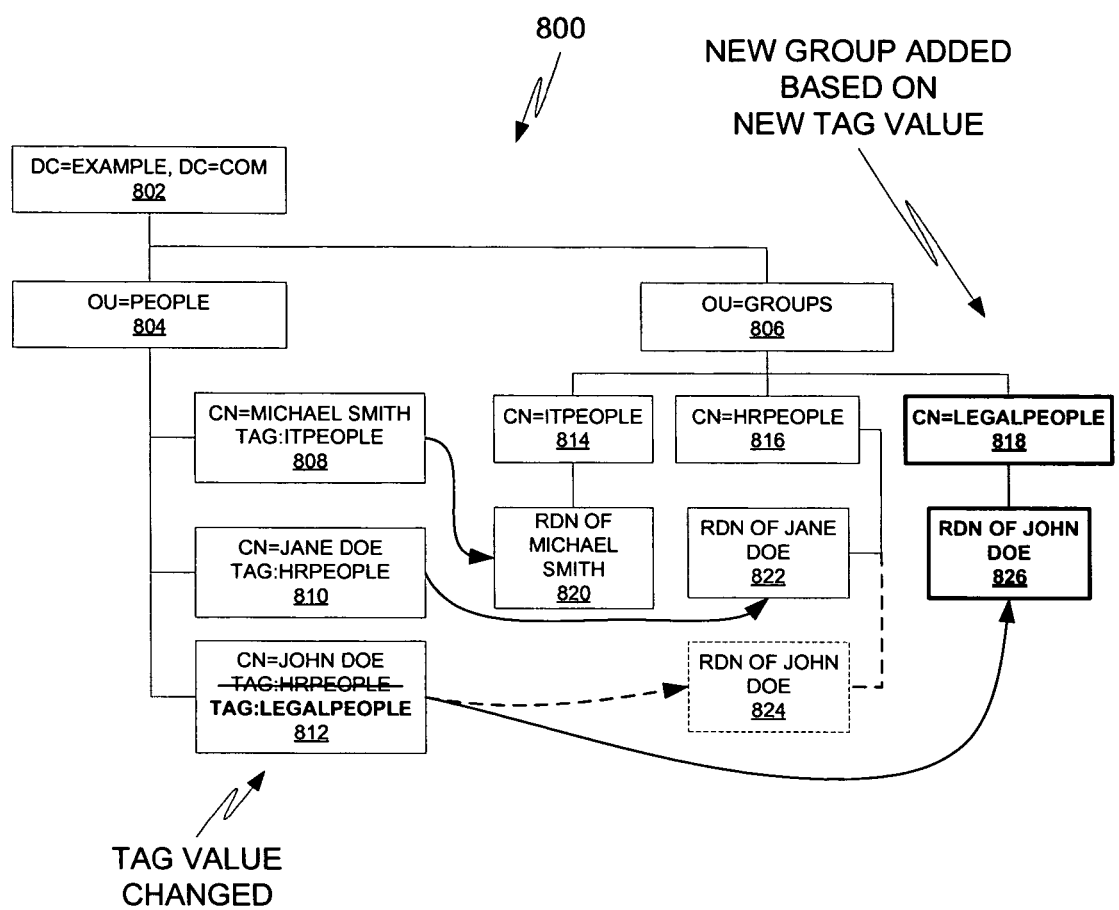
FIG. 8 illustrates a block diagram of a group of a directory server in accordance with another embodiment.

FIG. 8 illustrates a block diagram of another embodiment of a group management of an LDAP directory server. The distributed directory tree 800 includes a root entry 802 where a company named "Example.com" has a root entry of "dc=example, dc=com". The root entry 802 has a first node 804, and a second node 806. The first node 804 and second node 806 include entries for organization units (ou). For example, the first node 804 defines an organization unit subtree for employees in the company (ou=people). Entries 808, 810, and 812 correspond to individual employees working in the company "example.com". Each entry includes a Relative Distinguished Name (RDN) and at least one other attribute. One of the attribute may include a tag attribute where the value of the tag attribute describes the entry. The value may be used to create a corresponding group. The tag attribute may for example be "tag". For example, entry 808 may include "cn=michael smith" and "tag=itpeople". Similarly, entry 810 may include "cn=jane doe" and "tag=hrpeople".

However, the value of the tag attribute of the entry 812 for "cn=john doe" may be changed from "tag=hrpeople" to "tag=legalpeople". This means that "john doe" is an individual employee of the organization "example.com" and is no longer part of the HR people of the organization "example.com" but is now part of a Legal group of the organization "example.com". The change in the value of the tag attribute of the entry 812 is reflected in the change in the content of the groups 806.

The second node 806 defines an organization unit subtree for groups in the company (ou=groups). The groups may be based on the value of the tag attribute in the entries under "ou=people" 804. The content of IT group 814 and HR group 816 is dynamically populated and maintained based on the value of the tag attribute in the employee entries 808, 810, 812. Entry 820 populates the content of group 814. Entry 822 populates the content of group 816. Because the value of the tag attribute in entry 812 corresponds to a non-existing group under "ou=groups" 806, a new group is automatically created under "ou=groups" 806 based on the modified value of the tag attribute of entry 812. In the example of FIG. 8, a "legalpeople" group did not exist and thus a new Legalpeople group 818 having "cn=legalpeople" is created. In accordance with one embodiment, when a new group is created, the new group is a static group.

Furthermore, because the tag attribute of entry 812 has been changed from "hrpeople" to "legalpeople", the former corresponding entry 824 under the group "hrpeople" 816 has been deleted.

In accordance with one embodiment, groups under "ou=groups" 806 may include a static group and/or a dynamic group. For a static group, once the tag attribute of an entry is updated, the static group's membership is automatically (and explicitly) modified to include a new member or delete an old member. For a dynamic group, a filter is modified or edited to retrieve all entries with the tag attribute equal to the ID of the dynamic group. Subsequently, when a request for a list of members of the dynamic group is received, the filter is used to generate a list of members of this dynamic group.

Figure 9:
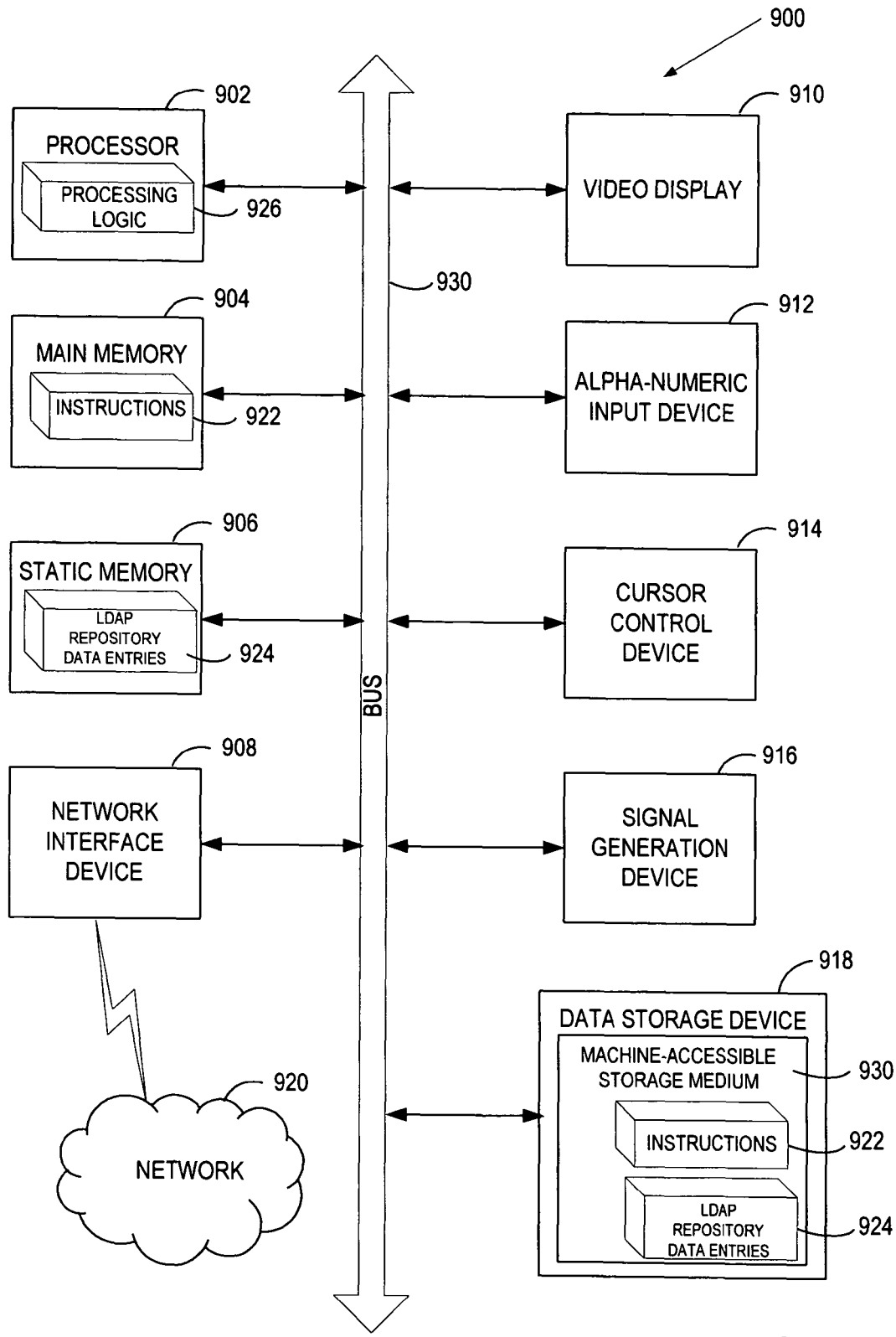
FIG. 9 illustrates a block diagram of an exemplary computer system.

FIG. 9 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-accessible storage media. The software 922 may further be transmitted or received over a network 920 via the network interface device 908.

The machine-accessible storage medium 930 may also be used to store LDAP repository data entries 924. LDAP repository data entries 924 may also be stored in other sections of computer system 900, such as static memory 906.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for dynamically managing groups have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for managing a directory server, the method comprising:
maintaining one or more groups in a repository that is coupled to the directory server, the groups comprising content that is populated by one or more entries having a tag attribute that is associated with the group;
assigning a tag attribute and a corresponding value to an entry in the directory server, the tag attribute identifying a group, the value of the tag attribute defining a group, the same tag attribute used for both static and dynamic groups;
determining whether the value of the tag attribute of the entry identifies an existing group in the repository;
adding the entry to the existing group in response to a determination that the value of the tag attribute of the entry identifies an existing group, wherein the group entry comprises a relative distinguished name of the entry;
creating a new group based on the value of the tag attribute of the entry in response to a determination that the value of the tag attribute of the entry does not identify an existing group, and adding the entry to the new group; and
dynamically changing the content of the at least one of the existing group and the new group based on the value of the tag attribute of the entry in response to adding the entry at least one of the existing group and the new group.

2. The method of claim 1 wherein the content comprises a membership.

3. The method of claim 1 wherein the directory server comprises a Lightweight Directory Access Protocol (LDAP) repository.

4. The method of claim 1 wherein the at least one of the existing group and the new group comprises a static group or a dynamic group.

5. The method of claim 1 wherein the content of the at least one of the existing group and the new group is dynamically changed such that the entry does not have to be manually added to the at least one of the existing group and the new group.

6. The method of claim 1 wherein dynamically changing the content of the at least one of the existing group and the new group comprises:
determining that the value of the tag attribute of the entry corresponds to the at least one of the existing group and the new group; and
adding the entry to the content of the at least one of the existing group and the new group.

7. The method of claim 1 wherein dynamically changing the content of the existing group comprises:
determining that the value of the tag attribute of the entry no longer corresponds to the existing group; and
deleting the entry from the content of the existing group.

8. The method of claim 1 further comprising:
adding an entry to the at least one of the existing group and the new group; and
modifying the value of the tag attribute of the entry corresponding to the added entry to the at least one of the existing group and the new group.

9. The method of claim 1 further comprising:
removing an entry from the existing group; and
modifying the value of the tag attribute of the entry corresponding to the removal of the entry from the existing group.

10. A directory server comprising:
a Lightweight Directory Access Protocol (LDAP) repository to store one or more groups, the groups comprising content that is populated by one or more entries having a tag attribute that is associated with the group; a processor,
coupled to the LDAP repository executing a, the group management module configured to assign a tag attribute and a corresponding value to an entry in the directory server, the tag attribute identifying a group, the value of the tag attribute defining a group, to determine whether the value of the tag attribute of the entry identifies an existing group in the repository, to add the entry to the existing group in response to a determination that the value of the tag attribute of the entry identifies an existing group, to create a new group based on the value of the tag attribute of the entry in response to a determination that the value of the tag attribute of the entry does not identify an existing group and to add the entry to the new group, and to dynamically change the content of the at least one of the existing group and the new group based on the value of the tag attribute of the entry in response to adding the entry at least one of the existing group and the new group, wherein the same tag attribute is used for both static and dynamic groups, and wherein the group entry comprises a relative distinguished name of the entry.

11. The directory server of claim 10 wherein the content comprises a membership.

12. The directory server of claim 10 wherein the at least one of the existing group and the new group comprises a static group or a dynamic group.

13. The directory server of claim 10 wherein the directory server dynamically changes the content of the at least one of the existing group and the new group such that the entry does not have to be manually added in the at least one of the existing group and the new group.

14. A non-transitory computer-accessible storage medium including data that, when accessed by a computer system, cause the computer system to perform a method comprising:
    maintaining one or more groups in a repository that is coupled to the directory server, the groups comprising content that is populated by one or more entries having a tag attribute that is associated with the group;
    assigning a tag attribute and a corresponding value to an entry in the directory server, the tag attribute identifying a group, the value of the tag attribute defining the group, the same tag attribute used for both static and dynamic groups, wherein the group entry comprises a relative distinguished name of the entry;
    determining whether the value of the tag attribute of the entry identifies an existing group in the repository;
    adding the entry to the existing group in response to a determination that the value of the attribute of the entry identifies an existing group;
    creating a new group based on the value of the tag attribute of the entry in response to a determination that the value of the tag attribute of the entry does not identify an existing group, and adding the entry to the new group; and
    dynamically changing the content of the at least one of the existing group and the new group based on the value of the tag attribute of the entry in response to adding the entry at least one of the existing group and the new group.

15. The non-transitory computer-accessible storage medium of claim 14 wherein the content comprises a membership.

16. The non-transitory computer-accessible storage medium of claim 14 wherein the directory server comprises a Lightweight Directory Access Protocol (LDAP) repository.

17. The non-transitory computer-accessible storage medium of claim 14 wherein the at least one of the existing group and the new group comprises a static group or a dynamic group.

18. The non-transitory computer-accessible storage medium of claim 14 wherein the content of the at least one of the existing group and the new group is dynamically changed such that the entry does not have to be manually added in the at least one of the existing group and the new group.

* * * * *